United States Patent [19]

Cubbison, Jr.

[11] 4,373,118

[45] Feb. 8, 1983

[54] BATTERY FEED CIRCUIT

[75] Inventor: Richard James Cubbison, Jr., Littleton, Colo.

[73] Assignee: Bell Telephone Laboratories, Incorporated, Murray Hill, N.J.

[21] Appl. No.: 271,604

[22] Filed: Jun. 8, 1981

[51] Int. Cl.³ .......................................... H04M 19/00
[52] U.S. Cl. .............................. 179/77; 179/170 NC; 179/16 F; 179/81 R
[58] Field of Search ................ 179/77, 170 NC, 16 F, 179/81 R, 23, 34, 40, 50

[56] References Cited

U.S. PATENT DOCUMENTS 3,789,803  2/1974  Davis et al. ...................... 179/81 R
4,039,766  8/1977  Picandet ...................... 179/170 NC

*Primary Examiner*—Stafford D. Schreyer
*Attorney, Agent, or Firm*—J. M. Graziano

[57] ABSTRACT

Electronic battery feed circuits are connected across the communication pair, in parallel with the voice transformer, and serve as a dc path for loop current. These electronic battery feed circuits must provide both a low dc impedance to sink loop current and a high ac impedance so as not to shunt the ac signal away from the transformer. Prior art electronic battery feed circuits draw their bias current directly from the communication pair and this configuration tends to unbalance the line, provide too low an ac impedance, and provide too high a dc impedance. The subject electronic battery feed circuit obtains a low level bias current from the voice transformer and presents a low dc impedance to loop current. This particular circuit configuration eliminates hybrid balance problems and ac shunting of the voice transformer.

9 Claims, 2 Drawing Figures

BATTERY FEED CIRCUIT

FIELD OF THE INVENTION

This invention relates to battery feed circuits, and in particular, to an electronic battery feed circuit connected in parallel with a voice transformer. The subject electronic battery feed circuit obtains a low level bias current from the voice transformer and thereby presents both a low dc impedance to loop current and a high ac impedance to voice signals.

DESCRIPTION OF THE PRIOR ART

In telephone switching systems, each communication pair must be terminated by some circuitry that provides both a low dc impedance for dc loop current and some means of picking off the ac voice signal. In the past, large transformers were used for both purposes but were expensive in both cost and size due to the requirement that fairly substantial loop currents be handled. An alternative is to use a battery feed circuit which is comprised of the combination of a voice-grade transformer that does not carry the dc loop current and an electronic battery feed circuit. The electronic battery feed circuit is connected across the communication pair, in parallel with the voice transformer, and serves as a dc path for loop current. These electronic battery feed circuits must concurrently provide both a low dc impedance to sink dc loop current and a high ac impedance so as not to shunt the ac signal away from the voice transformer portion of the battery feed circuit. Prior art electronic battery feed circuits draw their bias current directly from the communication pair and this configuration tends to unbalance the communication pair, provides too low an ac impedance to the voice signals, and presents too high a dc impedance to loop current. The selection of impedance values in these prior art circuits is a compromise resulting from the need to satisfy conflicting requirements and generally yields unsatisfactory results.

SUMMARY OF THE INVENTION

The subject invention overcomes these problems by obtaining the required electronic battery feed bias current from the voice transformer portion of the battery feed circuit. This configuration eliminates the ac shunting effect caused by the prior art electronic battery feed arrangements and enables the circuit designer to obtain a dc loop closure circuit having both a very low dc impedance and a high ac impedance. The voice transformer (in series with a low ac impedance dc blocking capacitor) is connected in parallel with this dc loop closure circuit and, due to the relative ac impedances of the two circuits, receives essentially all of the ac voice signal. Thus, this electronic battery feed circuit configuration provides the desired characteristics without any of the limitations of the prior art arrangements.

DETAILED DESCRIPTION, FIG. 1

Figure 1:
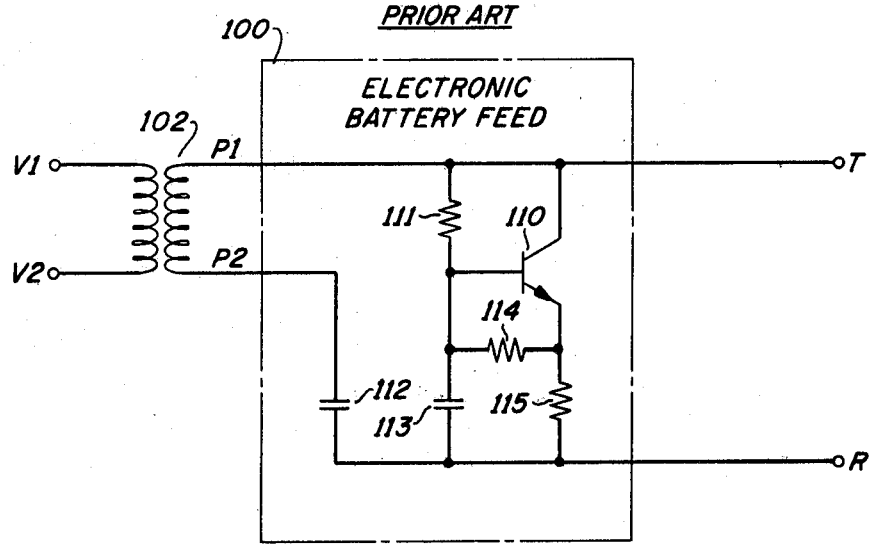
FIG. 1 illustrates a typical prior art battery feed circuit.

FIG. 1 illustrates a typical prior art electronic battery feed circuit 100 which is connected across the communication pair, leads T and R, in parallel with the voice transformer 102. Electronic battery feed circuit 100 serves as a path for the dc loop current since voice transformer 102, for reasons of economy in size and cost, is a voice-grade transformer which cannot carry a high level of dc current. Therefore, dc blocking capacitor 112 is connected in series with transformer 102 so that transformer 102 cannot provide a path for dc loop current. Electronic battery feed circuit 100 is designed to look like a level shifter for dc and a high impedance current sink for ac. The dc level shifter portion of electronic battery feed circuit 100 consists of transistor 110 and resistors 111 and 114. Since resistor 114 is connected in parallel with the base-emitter junction of transistor 100, the dc voltage across resistor 114 will be the base-emitter voltage drop, which is typically 0.7 volts. All of the current which passes through resistor 114 must also pass through resistor 111 creating a voltage of $0.7 \times R_{111}/R_{114}$ across resistor 111 where $R_{111}$ and $R_{114}$ are the resistance values of resistors 111 and 114 respectively. The net effect of this is a constant dc voltage from collector to emitter of the transistor, since this voltage is solely determined by the base-emitter voltage of transistor 110, which voltage is a relatively fixed quantity.

The high ac impedance characteristics of electronic battery feed circuit 100 are provided by capacitor 113 and the emitter degeneration resistor 115. An ac voltage appearing across the communication pair, leads T and R, will cause a current to flow through the above-described dc level shifter into resistor 115. This will result in a voltage across resistor 115 which will act upon the base-emitter junction of transistor 110 producing a negative feedback which causes the dc level shifter to inhibit the passage of the ac current. Capacitor 113 allows the negative feedback effects for ac signals but prevents this from happening at dc. Thus, electronic battery feed circuit 100 acts at dc as a dc level shifter and at ac as a high impedance. The net ac impedance of this circuit is given by the following formula:

$$Z_{AC} = R_e \left[ 1 + \beta \frac{R_{115}}{r + R_{115}} \right] + \frac{r R_{115}}{r + R_{115}} \quad (1)$$

$$\approx R_e \left[ 1 + \beta \frac{R_{115}}{r + R_{115}} \right] \quad (2)$$

The most dominant impedances of the transistor are represented by $R_e$, which is the leakage resistance from collector to emitter and r which is the base resistance of the transistor. It is obvious from this formula that resistor 115 should be very large so that the impedance is high at ac. However, the desired low impedance dc characteristics require that this resistor be small, as can be seen from the following formula which gives the voltage/current characteristics of electronic battery feed circuit 100:

$$V_{DC} = 0.7 + .07 \left( \frac{R_{111}}{R_{114}} \right) + R_{115} I_{DC} \quad (3)$$

A mid range value is usually selected for resistor 115, which value optimizes neither ac nor dc performance but provides adequate values for both.

It is obvious from the above equations that increases solely in the ac impedance can also be obtained by increasing the beta of the transistor. One typical way of increasing the beta of a transistor is by using Darlington transistors or other multiple configurations, but this solution presents only a very limited improvement as is obvious if the circuit analysis is done in detail. In any case, the prior art electronic battery feed circuit 100 still provides too low an ac impedance and too high a dc impedance for satisfactory performance since resistor 111 provides a low ac impedance leakage path across the communication pair. Increases in the value of resistors 111, 114 and the beta of transistor 110 have limited effectiveness since they do nothing to eliminate this low ac impedance leakage path. As a result, some of the ac signal is shunted away from the primary winding P1, P2 of voice transformer 202 and the resultant signal which appears on the secondary winding $V_1$, $V_2$ of voice transformer 202 is significantly reduced in magnitude. Thus, the circuit of my invention, as illustrated in FIG. 2, has been provided to overcome these problems.

Figure 2:
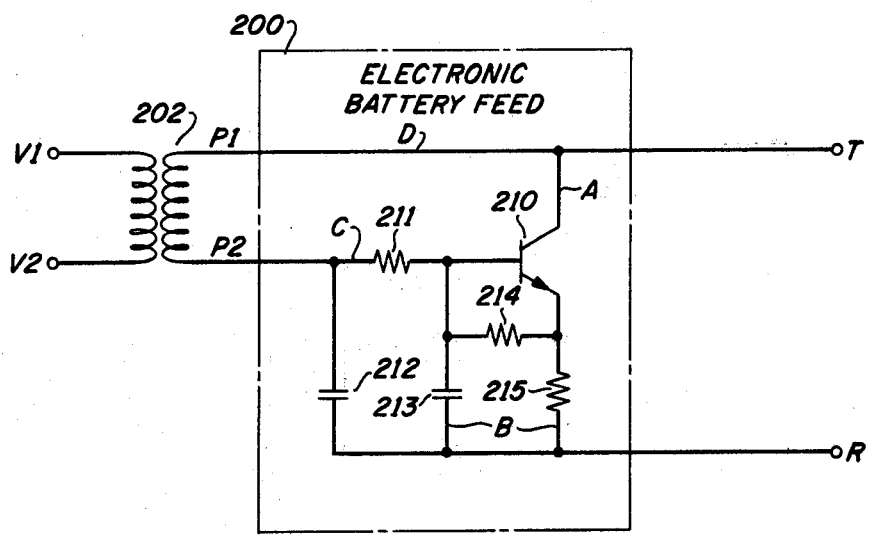
FIG. 2 illustrates the preferred embodiment of the battery feed circuit of my invention.

FIG. 2 illustrates the electronic battery feed circuit 200 of my invention, which circuit is fairly similar to the prior art electronic battery feed circuit 100 of FIG. 1. The significant difference is that bias current for transistor 210 is obtained on lead C through voice transformer 202. Capacitor 212 is a very low ac impedance dc blocking capacitor which is connected in parallel (between leads C and B) with the remaining circuitry of electronic battery feed circuit 200 and therefore provides a bypass path for the ac signal. Terminal P1 of voice transformer 202 is directly connected to lead T of the communication pair via lead D of electronic battery feed circuit 200. Thus, given the very low ac impedance value of capacitor 212, essentially all the ac signal from communication pair leads T and R will appear across winding P1, P2 of voice transformer 202. This is especially true since in electronic battery feed circuit 200 the collector-to-base junction of transistor 210 provides a relatively high ac impedance between leads A and C, which part of battery feed circuit 200 is connected in parallel with winding P1, P2 of voice transformer 202.

It is apparent from FIG. 2 that the low ac impedance leakage path across the communication pair of the prior art circuit has been eliminated. The ac impedance seen across the communication pair on leads A and B of the circuit of FIG. 2 is essentially winding P1, P2 of voice transformer 202 shunted by the base-collector junction of transistor 210 in series with resistor 211. The ac impedance of the base-collector junction of transistor 210 is typically very high so that the value of resistor 211 can be small to thereby optimize the dc characteristic of electronic battery feed circuit 200, without adversely affecting the ac characteristic. Additionally, a single transistor can be used for transistor 210 since the basic low ac impedance leakage problem has been eliminated and multiple transistors need not be used to minimize the leakage as in the prior art circuit. Thus, the dc characteristic of battery feed circuit 200, as determined by straightforward circuit analysis, is given by the following voltage/current characteristic formula:

$$V_{DC} = .07 + .07\left(\frac{R_{211}}{R_{214}}\right) + I_{DC}R_{215} \quad (4)$$

and the resistor values can be selected to make the dc impedance extremely low in value since there is no longer any interaction between the dc and ac impedance characteristics of electronic battery feed circuit 200.

In conclusion, the subject battery feed circuit (200, 202) is comprised of voice transformer 202 and electronic battery feed circuit 200. Electronic battery feed circuit 200 obtains its required bias current on lead C from voice transformer 202 and thereby eliminates the imbalance on the communication pair caused by prior art electronic battery feed circuits. Additionally, this circuit configuration of electronic battery feed circuit 200 results in a high ac impedance being placed across winding P1, P2 of voice transformer 202 thereby eliminating the ac shunting problem of prior art electronic battery feed circuits. Therefore, the ac signals on the communication pair appear across winding P1, P2 of voice transformer 202 and are outputted to winding $V_1$, $V_2$ of voice transformer 202 in magnitude greater than that previously obtainable.

While a specific embodiment of the invention has been disclosed, variations in structural detail, within the scope of the appended claims, are possible and are contemplated. There is no intention of limitation to what is contained in the abstract or the exact disclosure as herein presented. The above-described arrangements are only illustrative of the application of the principles of the invention. Normally, other arrangements may be devised by those skilled in the art without departing from the spirit and the scope of the invention.

What is claimed is:

1. An electronic battery feed circuit (200) for interfacing one winding of a voice transformer (202) having first (P1) and second (P2) terminals with first (T) and second (R) leads respectively of a communication pair, comprising:

dc blocking means (212) connected between said second terminal (P2) of said voice transformer (202) and said second lead (R) of said communication pair for providing a low ac impedance and high dc impedance path therebetween;

connecting means (D) for directly connecting said first terminal (P1) of said voice transformer (202) to said first lead (T) of said communication pair;

current sink means (210, 211, 213-215) having input (A) and output (B) terminals connected respectively to said first (T) and said second (R) leads of said communication pair, and having a control terminal (C) wherein said current sink means (210, 211, 213-215) is responsive to the application of a bias current to said control terminal (C) for providing a low dc impedance, high ac impedance path between said input (A) and said output (B) terminals; and wherein said control terminal (C) is directly connected to said second terminal (P2) of said voice transformer (202) for obtaining said bias current from said voice transformer (202).

2. The invention of claim 1 wherein said dc blocking means (212) comprises a capacitor, having a low ac impedance.

3. The invention of claim 1 wherein said current sink means (210, 211, 213-215) includes:

dc level shifter means (210, 211, 214);

ac impedance means (213, 215);

wherein said dc level shifter means (210, 211, 214) is connected between said ac impedance means (213, 215) and said first lead (T) of said communication pair;

wherein said ac impedance means (213, 215) is connected between said dc level shifter means (210, 211, 214) and said second lead (R) of said communication pair for presenting a high ac, low dc impedance therebetween; and wherein said dc level shifter means (210, 211, 214) is also connected to said control terminal (C) and is responsive to said bias current for providing a constant voltage drop between said first lead (T) of said communication pair and said ac impedance means (213, 215).

4. The invention of claim 3 wherein said dc level shifter means (210, 211, 214) comprises:

transistor means (210) having base, emitter and collector terminals, wherein said collector terminal is connected to said input terminal (A);

first resistor means (211) connected between said control terminal (C) and said transistor means base terminal for supplying said transistor means (210) with a drive current; and second resistor means (214) connected between said base and said emitter terminals of said transistor means (210) for providing positive feedback therebetween.

5. The invention of claim 4 wherein said ac impedance means (215, 213) comprises:

third resistor means (215) connected between said emitter terminal of said transistor means (210) and said output terminal (B) for increasing the ac impedance of said current sink means (210, 211, 213-215); and ac feedback means (213) connected between said base terminal of said transistor means (210) and said output terminal (B) for providing negative ac feedback therebetween to block the passage of ac signals through said current sink means (210, 211, 213-215).

6. The invention of claim 5 wherein said ac feedback means (213) comprises a low ac impedance capacitor.

7. A battery feed circuit (200, 202) for providing a dc and an ac termination for a communication pair having first (T) and second (R) leads comprising:

ac pickoff means (202, 212) having a first (P1) and a second (B) terminal connected to said first (T) and said second (R) leads of said communication pair respectively for presenting a high dc impedance and a low ac impedance path between said first (T) and said second (R) leads of said communication pair and for isolating the ac signals which appear on said communication pair;

current sink means (210, 211, 213-215) having a first (A) and a second (B) terminal connected to said first (T) and said second (R) leads respectively, and a control terminal (C), wherein said current sink means (210, 211, 213-215) is responsive to a bias current being applied to said control terminal (C) for providing a low dc impedance, high ac impedance path between said first (A) and said second (B) terminals of said current sink means (210, 211, 213-215); and wherein said ac pickoff means (202, 212) includes a voice transformer (202) for supplying said bias current to said control terminal (C).

8. The invention of claim 7 wherein said ac pickoff means (202, 212) comprises:

voice transformer means (202) having a first winding ($V_1$, $V_2$) for outputting said ac signals and a second winding having first (P1) and second (P2) terminals;

dc blocking means (212) connected between said second terminal (P2) of said second winding of said voice transformer means (202) and said second lead (R) of said communication pair for presenting a low ac, high dc impedance therebetween; and wherein said first (P1) terminal of said second winding of said voice transformer means (202) is connected to said first lead (T) of said communication pair for presenting a high ac impedance between said first lead (T) of said communication pair and said dc blocking means (212) for receiving said ac signals appearing on said communication pair and coupling same to said first winding ($V_1$, $V_2$) of said voice transformer means (202).

9. The invention of claim 7 wherein said current sink means (210, 211, 213-215) includes:

transistor means (210) having base, emitter and collector terminals, wherein said collector terminal is connected to said input terminal (A);

first resistor means (211) connected between said control terminal (C) and said base terminal for supplying said transistor means (210) with a drive current;

second resistor means (214) connected between said base and said emitter terminals for providing positive feedback therebetween;

third resistor means (215) connected between said emitter terminal and said output terminal (B) for increasing the ac impedance of said current sink means (210, 211, 213-215); and ac feedback means (213) connected between said base and said output (B) terminals for providing negative ac feedback therebetween to block the passage of ac signals through said current sink means (210, 211, 213-215).

* * * * *